United States Patent [19]

Lehr

[11] 4,161,472

[45] Jul. 17, 1979

[54] IMPACT MODIFIED VINYL CHLORIDE POLYMER COMPOSITION

[75] Inventor: Marvin H. Lehr, Bath, Ohio

[73] Assignee: The B. F. Goodrich Company, Akron, Ohio

[21] Appl. No.: 871,665

[22] Filed: Jan. 23, 1978

[51] Int. Cl.$^2$ .................... C08L 51/04; C08L 53/02
[52] U.S. Cl. ............................ 525/4; 525/71;
525/80; 525/84; 525/87; 525/93; 525/96; 525/99; 525/98; 525/901
[58] Field of Search ............... 260/876 B, 876 R, 884, 260/890, 891, 899

[56] References Cited

U.S. PATENT DOCUMENTS

| | | | |
|---|---|---|---|
| 3,511,896 | 5/1970 | Harmer | 260/876 B |
| 3,557,252 | 1/1971 | Hsieh et al. | 260/876 B |
| 3,641,206 | 2/1972 | Weitzel et al. | 260/876 R |
| 3,652,483 | 3/1972 | Tanaka et al. | 260/884 X |
| 3,678,133 | 7/1972 | Ryan | 260/876 R |
| 3,801,529 | 4/1974 | Potter | 260/876 B X |
| 3,825,622 | 7/1974 | Robeson | 260/876 B |
| 3,992,485 | 11/1976 | Kosugi et al. | 260/884 X |
| 4,054,615 | 10/1977 | Hardt et al. | 260/876 R |
| 4,078,018 | 3/1978 | Chauvel et al. | 260/876 R X |

OTHER PUBLICATIONS

Penn *PVC Technology*, 3rd ed. (Wiley 1972) pp. 231–237, 372–375.

*Primary Examiner*—Thomas DeBenedictis
*Attorney, Agent, or Firm*—James R. Lindsay

[57] ABSTRACT

Polyvinyl chloride (PVC) resin is compounded with a conventional impact modifier referred to herein as a "co-modifier", and a block copolymer "ultra-modifier" which together provide a composition of unexpectedly enhanced impact strength. Irrespective of the characteristic particle size distribution of the co-modifier, which may be normal, bimodal or neither, the combination of ultra-modifier and co-modifier produces a broad distribution of small and large modifier particles. Better impact strength than with either small particles alone, or large particles alone is thus obtained. The ultra-modifier, which synergistically increases the impact strength of conventionally impact-modified vinyl chloride polymer compositions, consists essentially of a block copolymer of a vinyl aromatic compound and a conjugated diene, such as a styrene-diene (SD) diblock copolymer, or styrene-diene-styrene (SDS) block copolymer; the ultra-modifier is a polyblock copolymer, including linear diblock, triblock, tetrablock copolymers, and radial block copolymers including triblock and tetrablock copolymers. The co-modifier may be any elastomer additive, preferably a nucleated rubbery graft copolymer.

15 Claims, 2 Drawing Figures

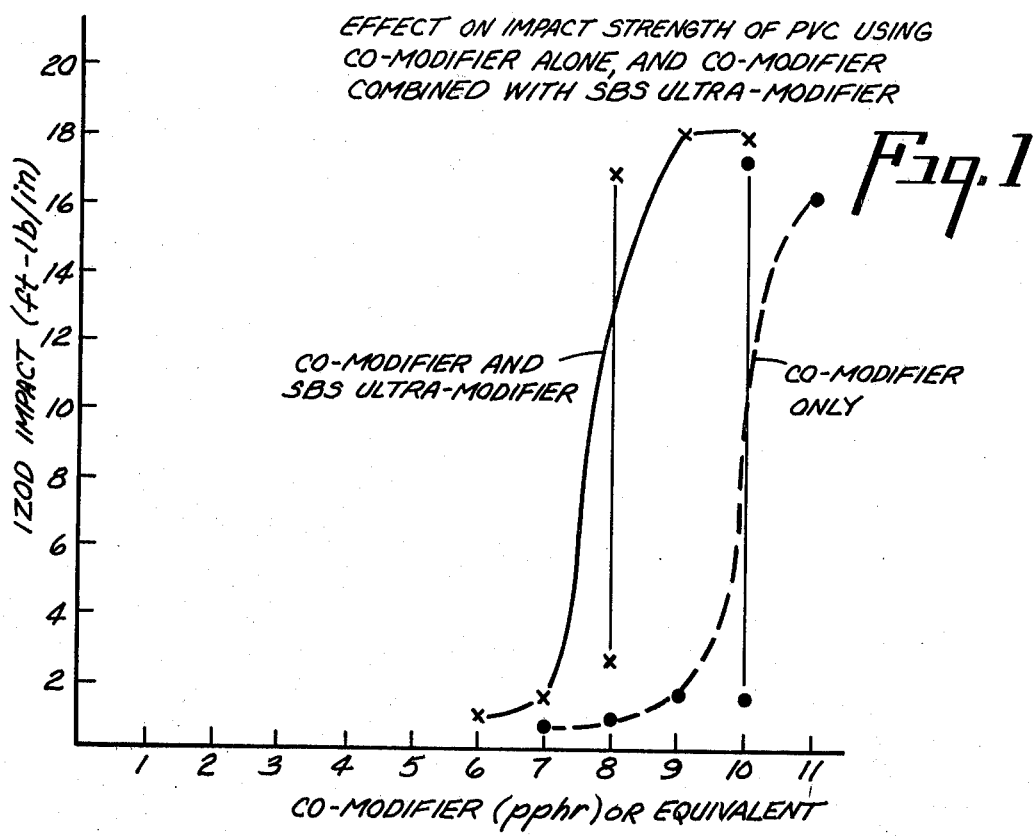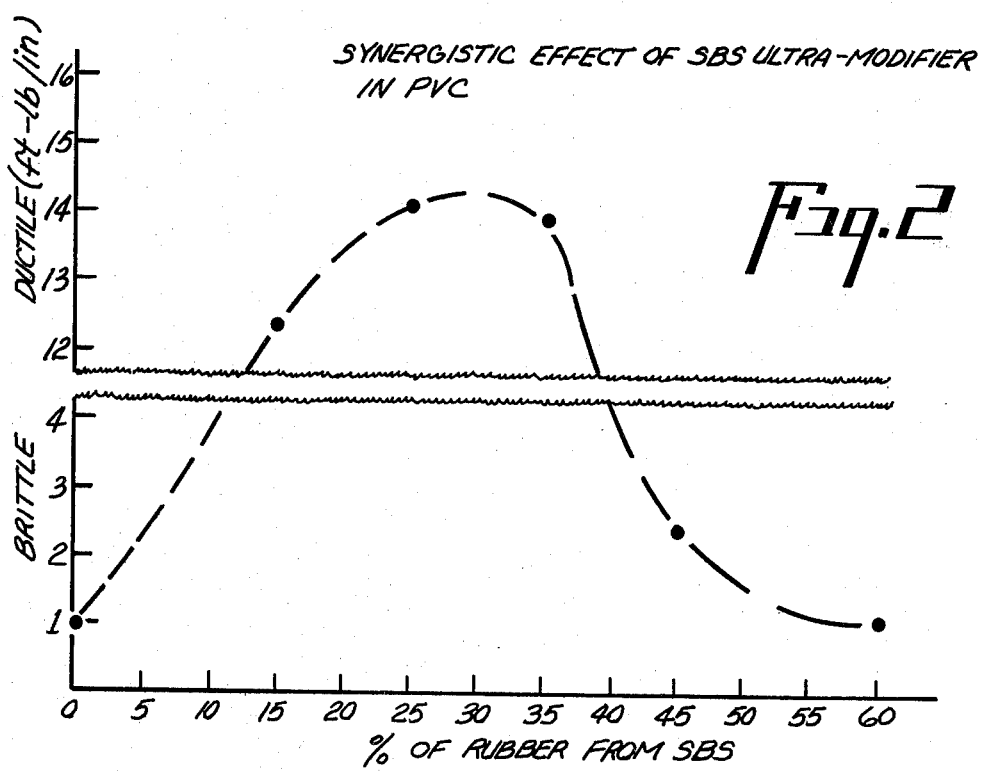

IMPACT MODIFIED VINYL CHLORIDE POLYMER COMPOSITION

BACKGROUND OF THE INVENTION

It is well known that vinyl chloride polymers, including homopolymers of vinyl chloride, and copolymers of vinyl chloride with other monomers copolymerizable therewith, have inherently low-impact properties. The burgeoning demand for polyvinyl chloride (PVC) articles in particular, and the fact that impact-deficient vinyl chloride polymers lend themselves to being transformed to impact-resistant polymers by the addition of impact modifiers, has led to the expenditure of great effort to develop better impact modified vinyl chloride compositions. This effort is especially directed to rigid-PVC applications where acceptable impact strength is critical. Such applications include the manufacture of exterior structural products, rigid panels, pipe and conduit, injection-molded and thermoformed industrial parts, appliance housings, and various types of containers both large and small.

Elastomeric additives which reduce the brittle temperature of vinyl chloride polymers, are the most commonly used impact modifiers and include conjugated diene homo and copolymers or, acrylic polymers. Particularly preferred are graft copolymers containing butadiene which generally offer excellent impact improvement because of their low glass-transition temperatures ($T_g$).

Other impact modifiers include chlorinated polyethylene (CPE), ethylene-vinyl acetate copolymers (EVA), acrylate-methacrylate (all acrylic) polymers, grafted elastomers based on vinyl chloride (VC), nitrile rubbers (NBR), styrene-butadiene rubbers (SBR) and stearic acid coated calcium carbonate. These impact modifiers are conventionally used in a substantial amount, that is, an amount sufficient to provide at least a 20% increase in Izod impact strength of a non-impact modified vinyl chloride polymer matrix. Since, in this invention, the conventional impact modifiers are used in combination with block copolymer impact modifiers, the conventional impact modifiers are referred to herein as "co-modifiers".

Graft copolymers such as acrylonitrile-butadiene-styrene (ABS), or methyl-methacrylate-butadiene-styrene (MBS) have become the major impact modifiers in commercial use because they retain sufficient elastomeric qualities for good impact behavior, and also sustain the product clarity essential to many packaging applications. Such graft copolymers are preferably overpolymerized graft copolymers. There was no reason to expect that a block copolymer of any kind, and more particularly a block copolymer selected from a linear diblock or polyblock copolymer and a radial teleblock copolymer of a vinyl aromatic (S) and a conjugated diene (D), defined hereinafter, should or could synergistically boost the impact effectiveness of the co-modifier in a conventionally impact-modified vinyl chloride polymer. Yet, it does.

It is because of this boosting power of a SD and/or a SDS block copolymer, namely, to boost the impact resistance attributable to conventional co-modifiers, that the block copolymer is referred to herein as an "ultra-modifier". A preferred ultra-modifier is selected from a styrene-butadiene (SB) diblock, and a linear polyblock or radial teleblock styrene-butadiene-styrene (SBS) copolymer, and in this invention, the ultra-modifier must be used in combination with a co-modifier, provided the co-modifier, used in the absence of ultra-modifier, produces substantial impact improvement.

Styrene-diene-styrene (SDS) block copolymers with styrene blocks on the ends of the polymer molecule are known to produce strong elastomeric materials without vulcanization. When used as a sole impact modifier, they are known to produce marginal impact resistance in vinyl chloride polymers (Potepalova S.N., Malyshev L.N. and Savel'ev A.P., Plast. Massy. 8 41, 1973). In view of such marginal impact improvement attributable to these block copolymers when used alone, it is surprising that, when combined with conventional co-modifiers, these block copolymers synergistically boost the impact properties of PVC.

U.S. Pat. No. 3,825,622 to Robeson L.M. et al., discloses blends of (a) vinyl chloride polymer with (b) from about 40 to about 85 parts by weight, per 100 parts of vinyl chloride polymer, of a graft copolymer of a lactone grafted onto a reactive polymer of ethylenically unsaturated monomers, and (c) about 7 to about 40%, based on the weight of lactone copolymer, of a SDS block copolymer. There is no suggestion that the lactone graft copolymer provides any desirable impact modification and it does not. The reference states the lactone copolymer is a desirable plasticizer; however because the plasticized blend of vinyl chloride resin and lactone graft copolymer does not provide sufficient impact resistance, the reference teaches adding an SDS block copolymer. More specifically it is evident that vinyl chloride resin and graft copolymer plasticizer exist as a single phase characteristic of a plasticized vinyl chloride resin. In contrast, any impact modifier, and particularly a graft copolymer impact modifier, exists in an impact modified vinyl chloride resin as a separate phase, whether the resin is plasticized or not. The existence of a rubbery phase dispersed in a continuous vinyl chloride resin phase critically distinguishes an impact modified vinyl chloride resin from one that is only plasticized. The reference teaches a plasticized vinyl chloride resin which is impact modified with SDS block copolymer present as the sole impact modifier to yield a flexible film with good impact properties as determined by the Masland cold crack test (a modified ASTM D-1790 test). The composition containing the SDS, which is not a rigid composition, then exhibits impact resistance, because the SDS is peculiarly compatible with the vinyl chloride polymer lactone graft copolymer blend.

The effect of the ultra-modifier is best demonstrated when the co-modifier consists of a rubbery backbone having graft copolymerized thereupon a hard resin which forms a hard shell (hence referred to as "hard shell type" resins). At least about 80% of the primary particles of the hard shell resin are in a size range from about 500 Å to about 5000 Å, generally either in a bimodal or a broad normal distribution of particle sizes. Known such graft copolymer impact modifiers for PVC typically include a rubbery base chain onto which is graft copolymerized homopolymers or copolymers of vinyl chloride, methyl acrylate, alkyl methacrylates, styrenes, substituted styrenes, acrylonitrile, methacrylonitrile, and the like. Other impact modifiers which are elastomeric additives also contribute a rubbery phase of discrete particles or agglomerates in the vinyl chloride resin phase, and together with an ultra-modifier diblock (SD) or polyblock (SDS) copolymer, provide a synergistic improvement of impact properties.

U.S. Pat. No. 3,383,435 discloses a co-modifier of the "hard shell" type in which styrene is homopolymerized into side chains onto a butadiene rubber backbone. Other hard-shell type co-modifiers are ABS resins disclosed in U.S. Pat. Nos. 2,802,808 and 3,238,275; PMMA/PBA resins disclosed in U.S. Pat. No. 3,655,825; MBS resins disclosed in U.S. Pat. No. 3,671,610; PVC/PBA resins in which vinyl chloride is overpolymerized on butylacrylate rubber; and the like.

The foregoing references disclose graft copolymers of the "hard shell" type used as impact modifiers in PVC, which hard shell type is generally characterized by a $T_g$ higher than 70° C., and preferably higher than 85° C. Though much theoretical work has been done to predict impact performance of various compounds, there is nothing to suggest that a hard shell type graft copolymer co-modifier be blended with SD or SDS block copolymer to increase the impact strength of PVC containing the co-modifier.

Though an SDS block copolymer has been used as the only impact modifier in vinyl chloride polymers, it is difficult to blend the block copolymer into the vinyl chloride polymer. For example, S. N. Potepalova et al in Plast. Massy. 8,41 (1973) reported that prolonged mixing was required to get a marginal improvement in impact strength when SBS was used as the sole impact modifier in PVC. There is no suggestion that SBS might behave quite differently, when used with a conventional impact modifier in vinyl chloride polymer resins, and especially, none that it may act as an ultra-modifier. There is no reason to expect that both SDS and DSD type block copolymers, whether linear or radial, diblock or triblock, might provide desirable impact properties only if a conventional impact modifier was also present.

SUMMARY OF THE INVENTION

It has been discovered that known polymers of a vinyl aromatic compound and a conjugated diene, such as melt-blendable styrene-diene (SD) linear diblock copolymers, or, styrene-diene-styrene (SDS) rigid or rubbery particulate block copolymers consisting essentially of a linear block copolymer or a radial teleblock copolymer, unexpectedly and synergistically boost the impact resistance of normally solid vinyl chloride polymers which are conventionally impact-modified with impact modifier referred to herein as a "co-modifier", provided the co-modifier itself contributes a substantial improvement of impact strength.

It has also been discovered that, though aforementioned SDS and SD block copolymers (referred to herein as "ultra-modifiers"), provided marginal impact resistance in vinyl chloride polymers in the absence of conventional co-modifiers, the block copolymers, when used in combination with the co-modifiers produce a sudden, surprising increase in the impact properties of the vinyl chloride polymer.

It has further been discovered that the aforementioned ultra-modifiers in combination with co-modifiers which are preferably overpolymerized graft copolymers, exhibit optimum impact properties when each is present as primary particles in a specific size range. By overpolymerized graft copolymers I refer to a hard resin grafted on a rubbery center (hence referred to herein as "hard shell") and the term co-modifiers is used hereinafter to refer to interpolymers which are essentially overpolymerized graft copolymers. Moreover it is desirable to use a co-modifier having primary particle sizes in the size range from about 500 Å to about 7000 Å, provided that less than 20 percent by weight are greater than about 5000 Å.

It has still further been discovered that a SDS block copolymer ultramodifier unexpectedly facilitates the processing of vinyl chloride polymers toughened with an overpolymerized graft copolymer, as does a linear diblock styrene-diene (SD) copolymer.

It is therefore a general object of this invention to provide an impact resistant composition comprising (a) a vinyl chloride polymer, (b) a co-modifier, and (c) an ultra-modifier block copolymer, such as SD or SDS block copolymer, optionally including additives for processability, flame retardancy, stability and the like.

It is also a general object of this invention to provide an ultramodifier which in combination with a conventional co-modifier provides a multiplicity of modifier particles distributed in an approximately normal distribution of size ranges rather than a bimodal distribution.

It is a specific object of this invention to provide a rigid plastic formulation of exceptional impact resistance, which formulation is a blend of (a) vinyl chloride polymer having primary particles in the size range from about 2500 Å (0.25μ) to about 2μ, (b) an over-polymerized graft copolymer having primary particles in the size range from about 500 Å to about 7000 Å wherein less than 20% by weight of the particles have a size greater than 5000 Å and (c) aSD or SDS block copolymer ultra-modifier having primary particles in the size range from about 200 Å to about 1μ (micron).

It is a more specific object of this invention to provide a rigid plastic formulation with the components described immediately hereinabove, wherein the rigid formulation may be formed from components which may be present as a blend of discrete resin particles, and component (b) may be a linear block copolymer or radial teleblock copolymer chosen from the SDS type with vinyl aromatic terminal blocks.

BRIEF DESCRIPTION OF THE DRAWINGS

FIG. 1 graphically illustrates in one curve, the effect of ultra-modifier and co-modifier together, on the impact strength of PVC, and in the other curve, the effect on the impact strength of PVC of only the co-modifier.

FIG. 2 graphically illustrates in a curve, with an intermediate, broken away portion, the synergistic effect of ultra-modifier in a PVC resin containing co-modifier; the data are obtained from samples in which the total rubber content of the composition is maintained essentially constant at about 6 parts rubber per 100 parts total resinous components.

DETAILED DESCRIPTION OF PREFERRED EMBODIMENTS

In a detailed embodiment of this invention, vinyl chloride polymer forms the matrix, continuous phase, continuum, or major phase in which is usually blended plasticizers, antioxidants, pigments, ultraviolet light stabilizers, impact modifiers, and the like. The following description, including examples of various vinyl chloride resin recipes compounded with hard shell resin or other co-modifiers, and block copolymer ultra-modifiers, and observations and tests related specifically to PVC compounded with both modifiers, disregards the use of all ingredients except those related to impact performance. It is expected that those skilled in the art can effectively utilize those ingredients which have no special impact-improving characteristics, in conjunction with the teachings as to ultra-modification of vinyl chloride polymers detailed in this invention.

Further, this invention is only incidentally concerned with the use of plural co-modifiers, as herein defined, in vinyl chloride polymers. Sometimes two graft copolymers are used by those skilled in the art, for their known, essentially merely additive effect which is easily distinguishable from the synergistic boost obtained from SD or SDS rubbery or rigid ultra-modifier block copolymer combined with any impact modifier, and particularly hard-shell graft copolymer in a vinyl chloride resin matrix.

The impact strength of vinyl chloride polymers generally, and PVC in particular, in the range from about 0.5 to about 2.0 ft-lb/in is known to be approximately directly correlatable to the concentration (wt %) of rubber in the PVC. In general, in this range of impact strength, the higher the wt % rubber, the higher the impact strength. Where more than one conventional co-modifier is used, the impact strength obtained is approximately correlatable to the cumulative wt % rubber content. Where a co-modifier is combined with an ultra-modifier, an increase in impact strength is obtained which is unexpectedly greater than that obtained if the combined wt % rubber was present as co-modifier alone. Quite commonly, a boost in impact strength is obtained with combined ultra-modifier and co-modifier, despite the total wt % rubber therein being less than that necessary in a co-modifier which produces comparable impact resistance. By "rubber" I refer herein to the butadiene or other rubbery content of the modifier used, whether it be the diene content of the block copolymer, or the diene or other similar rubber content of a conventional co-modifier.

It is not the primary purpose of this invention to provide a vinyl chloride polymer having the highest possible impact strength, but to provide desirable impact strength using less conventional co-modifier than normally used to provide a preselected impact strength, and replacing some of the conventional co-modifier with a block copolymer ultra-modifier. In some instances, the use of a combination of co-modifier and ultra-modifier which together constitute a smaller weight fraction of the impact-modified PVC than that of co-modifier alone.

In general, the more co-impact modifier used, the greater the impact strength, and the cost-effectiveness of a co-modifier is evaluated by comparing impact strength versus parts of co-modifier per hundred parts of vinyl chloride resin matrix.

Any comparison of co-modifiers must take into account the fact that their rubber contents vary widely. Since improved impact strength is attributable to the weight percent (wt %) rubber, and the rubber contents vary, formulations are compared at constant wt % rubber, or constant parts rubber per hundred parts resin (phr), and the total weight of resin includes PVC, polystyrene from the SBS (say) ultra-modifier block copolymer used, and resin from grafted impact modifier.

There is provided in this invention, an impact-modified thermoplastic composition comprising (a) a matrix comprising a resinous vinyl chloride polymer, (b) an impact modifier or co-modifier for reducing the brittle temperature of said vinyl chloride resin present in a substantial amount in the range from about 3 percent to about 25 percent by wt based on total resinous components, and (c) a block copolymer ultra-modifier of a vinyl aromatic compound (S) and a conjugated diene (D), of the linear block, or radial teleblock type, blocks (D) being of either lower or higher average molecular weight than those of blocks (S), component (c) being present in an amount in the range from about 1 to about 10 wt %, and preferably from about 2 to about 6 wt %, of the total resinous components of the composition. When component (b) is an over-polymerized graft copolymer of a hard shell type resin comprising an interpolymerization product of a diene rubber and a mono-unsaturated vinyl monomer, it is preferably present in the range from about 3% to about 25% by wt of the total resinous components.

It is essential in the composition of this invention, that the co-modifier used in the vinyl chloride polymer matrix contribute substantial impact strength to the matrix when the co-modifier is present in an amount in the range from about 3 wt % to about 25 wt % of the total resinous components of the composition. By "substantial" impact strength I refer to an increase in Izod impact strength of at least 20% over the impact strength of matrix without an impact modifier. The precise mechanism of this invention is unknown but a mechanism is hypothesized.

In this invention, a synergistic effect is obtained when SD or SDS block copolymer and a graft copolymer are used in combination, because they produce during molten polymer blending, a broad rubber particle size distribution. During melt mixing, the block copolymer contributes very small particles in the size range from about 200Å to about 1000Å, as well as some larger particles (1000–10,000Å), and in particular also causes the formation, by agglomeration, of larger particles of some but not all the grafted rubber particles of the conventional impact modifier. The overall size range of rubbery particles is thus broadened. By replacing about 20–40% of the rubber from the grafted modifier, by rubber from the block copolymer, a synergistic increase in impact strength is obtained. It is the combination of the separate particles of block copolymer and graft copolymer, in conjunction with their chemical affinity to form large agglomerates, which accounts for the action of the block copolymer as an ultramodifier.

The vinyl chloride polymers of this invention can be homopolymers of vinyl chloride, or copolymers of vinyl chloride and other monomers copolymerizable therewith, and constitute in excess of 50% by weight of the composition of this invention. More preferably the matrix of vinyl chloride polymer is present in the range from about 70% to about 95% by weight of the composition, the remainder being graft copolymer impact modifier and SDS block copolymer ultramodifier, other additives being disregarded for the purpose of this description. Examples of the other monomers referred to, include vinyl esters, such as a vinyl acetate, vinyl propionate, vinyl laurate, vinyl stearate, and the like; α-olefins, such as ethylene, propylene, butylene and the like; and alkyl acrylates or methacrylates having up to 18 carbon atoms in the alkyl moiety. Preferred copolymers include vinyl chloride/vinyl acetate copolymers and vinyl chloride/ethylene copolymers, the former containing from about 5 to about 20 weight percent of vinyl acetate, and the latter containing from about 0.3 to about 1.9 percent by weight of ethylene copolymerized therein. The vinyl chloride/vinyl acetate copolymers preferably have a specific viscosity in the range from about 0.5 to about 0.54; and vinyl chloride/ethylene copolymers preferably have a viscosity in the range from about 0.5 to about 0.7 units.

Preferred homopolymers of vinyl chloride are general purpose types of commercially available PVC which typically have inherent viscosities of 0.50 to 1.0, contain about 56.7 percent by weight chlorine, have a density of about 1.40 g/cm$^3$ and have a second-order transition temperature of between about 75° C. to about 85° C., by thermal analysis.

Suitable graft copolymers are those conventionally used as impact modifiers for vinyl chloride polymers, and for the most part, commercially available graft copolymers are preferred. These graft copolymers characteristically have a rubbery center upon which is graft copolymerized a shell of hard resin. The process for polymerization of the rubbery center and subsequent overpolymerization of the hard resin by graft copolymerization, is well known. Typical preferred graft copolymerized impact modifiers used for vinyl chloride polymers are: of MBS type, commercially available as BTA-III S and BTA III N from Kureha Co.; of the ABS type, available as Blendex 301 and 311 from Marbon; of the PMMA/PBA type, available as KM323B from Rohn & Haas; of the PVC/PBA/PVC type, available as Geon 300×6 from Goodrich; and, of the PVC/PBA type, prepared experimentally by polymerizing vinyl chloride on a latex of polybutyl acrylate.

Block copolymers of vinyl aromatic compounds and conjugated dienes are described in Kennedy et at., (Editor) "Polymer Chemistry of Synthetic Elastomers", Interscience, Vol. 23, Part II, 1969, pages 533-559; R. Zelinski and C. W. Childers "Rubber Chemistry and Technology" Vol. 41, page 161 et seq. (1968); and, "Technology" Vol. 43, page 22 et seq. (1970). Preferably, they will be of the SD or SDS type in which the relative ratios of the homopolymer blocks can vary. In the compositions of this invention, the block copolymer's blocks D will always be those of a conjugated diene, e.g., butadiene; isoprene, 1,3-pentadiene; 2,3-dimethyl-butadiene, and the like or mixtures of the foregoing; and, blocks S will always be derived from a vinyl aromatic compound, e.g., styrene, α-methyl styrene, vinyl toluene, vinyl xylene, vinyl naphthalene, or mixtures of any of the foregoing. In the most preferred compositions, the block copolymer ultra-modifier will have blocks S comprised of polystyrene, and blocks B comprised of polybutadiene.

The ultra-modifier necessarily has either a linear block or a radial teleblock structure, "teleblock" being used to designate copolymers with terminal block segments of one of the monomers used to produce them. Preferred are linear blocks having polyvinyl aromatic terminal blocks, and radial trichain and tetra-chain blocks having polyvinyl aromatic terminal blocks. Of course, linear diblocks have terminal S and D blocks, and in all the SDS copolymers the terminal blocks will be vinyl aromatic, e.g., from styrene. "Radial" means a network in which the polystyrene blocks make the rubber thermoplastic (by virtue of the weight content), and association provides a network of plastic areas connected by flexible diene rubber blocks so that the material has excellent mechanical properties without vulcanization. Although they are rubbery solids, the radial teleblock polymers soften and flow with heat and can be molded and extruded in the same manner as other thermoplastic materials. They can be remolded repeatedly without loss in properties. The precise structure of the block copolymer, that is, whether it is a diblock, triblock, or mixed polyblock copolymer is not critical, nor is its molecular weight, provided it is in the range specified hereinafter.

The ratio of the co-monomers can vary broadly, and the average molecular weight (mol wt) of combined blocks (D) may be either less than or greater than that of combined terminal blocks (S). It is preferred that the mol wt of combined blocks (D) be greater than the mol wt of combined blocks (S), to introduce desirable rubber into the composition. Higher rubber content is preferred if optimum impact strength is to be contributed by the ultra-modifier. Thus SD block copolymers are particularly useful and desirable if processing the components is not made too difficult. Typically the average mol wt of the block copolymer is in the range from about 50,000 to about 300,000, and the average wt % of the combined vinyl aromatic terminal blocks (S) will range from about 30% to about 50%. In preferred block copolymers the aromatic compound units comprise a minor fraction by weight of the block copolymer, and the diene units the major fraction from 50 to 80%.

The block copolymers are made by an organolithium initiated polymerization process in hydrocarbon solution using, for example, butadiene and styrene or other diene and vinyl aromatic monomers as is described in Kennedy et al, mentioned above.

In one process, a SDS block copolymer is prepared by dissolving the conjugated diene, e.g., butadiene, in an aromatic hydrocarbon solvent, e.g., xylene, toluene, etc., and adding 0.3 to 7.5 millimoles/100 parts of monomer, of an organolithium initiator, e.g., n-butyl lithium, etc. Polymerization of the diene is completed and then the vinyl aromatic compound is added and polymerization of this is completed to form the block copolymer. The product is precipitated and deactivated, e.g., with alcohol, such as ethanol or isopropanol and purified by redissolving in hydrocarbon and reprecipitating with alcohol.

In another process, the block copolymer is formed using, e.g., a secondary or tertiary alkyl lithium compound at about 100-2,000 parts per million based on the total weight of the monomers and a polymerization temperature in the range 20°-65° C. For example, styrene is dissolved in cyclohexane at 32° C., and treated with 5,530 parts per million of secondary butyl lithium. After polymerization is complete, isoprene is injected and polymerization is continued at 55°-57° C. The product can be recovered as described above.

Monovinyl-substituted aromatic hydrocarbons and conjugated diene block copolymers are commercially available from Shell Chemical Company under the trademark Kraton. These SDS block copolymers may be prepared by anionic solution polymerization methods with organo-metallic catalysts as more fully described in U.S. Pat. No. 3,265,765, the disclosure of which is incorporated herein by reference as if fully set forth, and the Encyclopedia of Polymer Science and Technology, 15, pgs 508-530, Interscience Publishers, NYC (1971). The commonly used designations of SBS for styrene-butadiene-styrene and SIS for styrene-isoprene-styrene block copolymers, are used for brevity, in this specification.

Other commercially available SBS block copolymers are useful ultra-modifiers; for example, the block copolymer resins available as Solprene rubbers, and K-resins KRO-1 and KRO-3 from Phillips Petroleum Company, which resins are more fully disclosed in U.S. Pat. No. 3,639,517 inter alia, the disclosures of which are incorporated herein by reference as if fully set forth. KRO-1 contains about 73.6 wt percent of pure polystyrene blocks, balance, polybutadiene blocks, the polybutadiene having a substantial percent of the cis-1,4-microstructure. The intrinsic viscosity in a typical sample is 0.67 dl/g (in chloroform at 25° C.). KRO-3 is a radial teleblock copolymer, like KRO-1, but the styrene content is about 75.8 wt percent and the intrinsic viscosity is slightly lower, about 0.64 dl/g. The glass transition point of the polybutadiene segments in each case is about $-90°$ C. KRO-1 shows a bimodal molecular weight distribution by gel phase chromatography. KRO-3 has a smaller, low molecular weight peak.

The method of forming the polymer composition is not critical, prior art blending techniques being suitable. The preferred method comprises melt blending the resinous components and additives in any of several ways, including providing the components in powder, granular, filamentous, or other convenient form, extruding the blend and chopping into pellets for molding to preselected shape by molding means conventionally used to mold normally solid thermoplastic compositions. In some instances the components of the composition may be utilized as a blend of powders which blend may be directly formed into rigid shapes, for example, by extrusion.

The importance of the boost in impact properties contributed by a relatively small amount of SDS ultra-modifier generally less than 10 wt % of the resinous components of the composition, is more particularly appreciated because the boost is achieved without adversely affecting the room temperature tensile properties and heat distortion temperature of the composition. In fact, in most cases the processing of the ingredients during formulation of the composition of this invention is facilitated by the presence of the SDS or SD block copolymer.

At impact strain rates the beneficial effect of the SDS or SD block copolymer is manifested in a lower yield stress (craze initiation) and in an increased elongation to break (plasticity). The net effect, assuming the optimum amount is not exceeded, is that of adding more co-modifier (i.e. more rubber) without actually having done so.

The boost in impact strength attributable to the SDS block copolymer is not a transient effect such as sometimes results from frozen-in effects during rapid cooling. The impact strength and other desirable properties of the composition of this invention persist even after the composition is annealed below its $T_g$. The composition of this invention may be formulated in the same physical manner, utilizing the same equipment, as known conventionally impact-modified vinyl chloride polymers but with appropriate changes in the recipes to compensate for the fact that the SDS or SD block copolymers generally soften and hasten fusion of the vinyl chloride polymer ingredients. The invention will be more fully understood and appreciated by the further description of the specific embodiments set forth in the examples which follow. All parts and percentages refer to weight unless otherwise stated.

The following formulations are mechanically blended in a 4" Getty mill for about 2 mins at a temperature in a range from about 170° C.-177° C., and compression-molded into test pieces in a laboratory press.

In examples 1-4, Geon* 110×233 polyvinyl chloride homopolymer and block copolymer ultra-modifier are master-batched with Ca stearate lubricant and tin stabilizer, milled at 170° C., then compression molded into test pieces. The concentration of ultramodifier is in the range from 0 to about 15 percent. All batches include 2 parts Ca stearate and 2 parts Thermolite T-31. The Izod impact strengths tabulated for each example in Table I hereinbelow are the average of six samples. It should be noted that compression-molded test samples give lower impact strength than injection-molded ones; also, that these samples contain no co-modifier.

TABLE I

| Ex. No. | Matrix GEON® 110×233 g | Ultra-Modifier K-Resin KRO3,g | % RUBBER* | Izod Impact (ft-lb/in) | std. dev. (±S) |
|---|---|---|---|---|---|
| 1 | 100 | 0 | 0 | 0.48 | 0.15 |
| 2 | 95 | 5 | 1.2 | 0.65 | 0.21 |
| 3 | 90 | 10 | 2.3 | 0.83 | 0.30 |
| 4 | 85 | 15 | 3.5 | 0.37 | 0.18 |

*computed on the basis of KRO3 containing ≈23% rubber.

*GEON brand PVC resin is made by The B F Goodrich Company

From the foregoing data it is evident that the impact strength attributable to KRO3 ultra-modifier is marginally increased with increasing KRO3 concentration, up to about 10%, but decreases upon further addition of KRO3. The impact strength appears to peak at less than 1 ft-lb/in before it decreases.

In examples 5-14, Geon 110×233 polyvinyl chloride homopolymer is masterbatched with Hywax 125 lubricant, Thermolite-31 (T-31), a PMMA processing aid (K120N), and different amounts of an MBS co-modifier (BTA III N) together with an SBS ultra-modifier (Phillips radial block copolymer K-resin KRO3). Though the recipe may be melt-blended by milling at about 170° C. without a processing aid, blending is facilitated with the processing aid (blending time≈2 min). The concentration of co-modifier ranges from less than about 5% to about 10% of each batch. All batches include 3 g of K120N; 0.5 g of Hywax 125 and 2 g of T-31. The Izod impact strengths tabulated for each example in Table II hereinbelow are the average of six samples.

TABLE II

| Ex. No. | Matrix GEON 110×233 ("A"),g | Co-modifier BTAIIIN ("B"),g | Ultra-Modifier KRO3** ("C"),g | A+B+C | Total* rubber | Izod impact (ft-lb/in) clean | hinged | std. dev. (±S) |
|---|---|---|---|---|---|---|---|---|
| 5 | 100 | 7 | 0 | 107 | 5.4 | 0.73 | — | 0.01 |
| 6 | 100 | 8 | 0 | 108 | 6.2 | 0.89 | — | 0.22 |
| 7 | 100 | 9 | 0 | 109 | 6.9 | 1.72 | — | 0.47 |
| 8 | 100 | 10 | 0 | 110 | 7.7 | 1.75 | 17.4 | 1.6+ |
| 9 | 100 | 11 | 0 | 111 | 8.5 | — | 16.3 | 1.3 |
| 10 | 96.5 | 4.5 | 5.0 | 106 | 4.6 | 1.10 | — | 0.56 |
| 11 | 95.9 | 5.25 | 5.85 | 107 | 5.4 | 1.6 | — | 0.8 |
| 12 | 95.3 | 6.0 | 6.7 | 108 | 6.2 | 2.7 | 17 | 1.3+ |
| 13 | 94.7 | 6.75 | 7.5 | 109 | 6.9 | — | 18 | 0.5 |

TABLE II-continued

| Ex. No. | Matrix GEON 110×233 ("A"),g | Co-modifier BTAIIIN ("B"),g | Ultra-Modifier KRO3** ("C"),g | A+B+C | Total* rubber | Izod impact (ft-lb/in) clean | Izod impact (ft-lb/in) hinged | std. dev. (±S) |
|---|---|---|---|---|---|---|---|---|
| 14 | 94.1 | 7.5 | 8.4 | 110 | 7.7 | — | 18++ | 0.5 |

*The SBR content (≈77%) is included
**KRO3 contains ≈23% butadiene which is included in total rubber
+ for hinged breaks only
++ showed delamination In FIG. 1 there is shown a plot of data tabulated in Table II hereinabove, represented as a pair of curves showing the effect of using SBS ultra-modifier in combination with varying amounts of co-modifier (BTA III N), in contrast to using only co-modifier (BTA III N). The blends containing ultra-modifier are formulated so that 25% of the SBR rubber from the co-modifier is replaced with an equivalent amount of butadiene rubber contributed by the SBS ultra-modifier. Further, as SBS ultra-modifier is added, the "PVC" content is adjusted to that (SBS+"PVC"+BTA III N)=(PVC+BTA III N). It is seen that at least as high Izod impact values are obtained with co-modifier and ultra-modifier, as are obtained with a higher concentration of co-modifier alone.

In examples 15-20, Geon 110×233 PVC homopolymer is master-batched with Thermolite-31 tin stabilizer (T-31) a lubricant (Ca stearate), a styrene-acrylonitrile (SAN) processing aid (2301×36), and different amounts of an ABS co-modifier (Blendex* 301) together with an SBS ultra-modifier (radial teleblock copolymer K-resin KRO3). The concentration of co-modifier ranges from about 5% to about 15% of each batch. All batches include 3 g of 2301×36, 2 g of T-31 and 0.5 g of Ca stearate. The batches are compounded so that the rubber concentration is maintained constant at 6 phr based on total resin. Each Izod impact strength tabulated in Table III hereinbelow, is the average of six samples. Though a single conventional impact modifier or co-modifier is used in the examples herein, it may be desirable to use a mixture of compatible co-modifiers each being a preferred interpolymerization product of a hard resin grafted onto a rubbery polymer. If a mixture is used, the co-modifiers are together present in an amount in the range from about 5% to about 25% based on total resinous components, so as to effect at least a 20% improvement of Izod impact strength of the non-impact-modified matrix.

*Blendex resins are graft copolymer modifiers sold by Marbon Inc.

TABLE III

| Ex. No. | Matrix GEON 110×233 g | Co-modifier Blendex 301 g | Ultra-modifier KRO3 g | % rubber from KRO3 | Izod impact (ft-lb/in) clean | Izod impact (ft-lb/in) hinged | std. dev. (±S) |
|---|---|---|---|---|---|---|---|
| 15 | 92.1 | 14.0 | 0 | 0 | 1 | — | 0.5 |
| 16 | 90.2 | 11.9 | 3.9 | 15 | — | 12.4 | 1.3 |
| 17 | 89.1 | 10.5 | 6.5 | 25 | — | 14.1 | 0.7 |
| 18 | 87.8 | 9.1 | 9.1 | 35 | — | 13.90 | 1.1 |
| 19 | 86.6 | 7.7 | 11.7 | 45 | 2.4 | — | 0.8 |
| 20 | 84.2 | 5.6 | 15.6 | 60 | 1.1 | — | 0.4 |

*most samples delaminated.

The synergistic effect of the KRO3 SBS ultra-modifier is apparent from a plot of the data presented in Table III hereinabove, which plot is shown in FIG. 2 as a single-peaked curve, with the intermediate portion broken away. The lower portion of the curve represents brittle or clean breaks, and the upper portion represents ductile or hinged breaks. The results set forth in Table III corroborate the synergistic effect which is evident from the results set forth in Table II. The optimum in impact strength generally occurs in the range from about 10% to about 40% replacement of the rubber contributed by the hard-shell type co-modifier, with diene rubber contributed by the ultra-modifier. The optimum will vary depending upon the specific choice of hard-shell type co-modifier, the particular vinyl chloride polymer and the choice of ultra-modifier, and can be found with a little trial and error. It should be noted that % rubber contributed by SBS ultra-modifier is plotted along the horizontal axis, but that the total rubber is maintained constant at 6.0 phr of total resinous components.

The surprisingly beneficial effect evident in Table III cannot be attributed to a lower $T_g$ rubber in the SBS since the $T_g$ of diene in KRO3 ($T_g \approx -87°$ C.) is substantially identical with the rubber $T_g$ of Blendex 301($T_g \approx -84°$ C.). It is therefore hypothesized that the improved impact is attributable to morphological changes initiated by the addition of ultra-modifier. The optimum will vary depending upon the specific choice of hard-shell type co-modifier, the particular vinyl chloride polymer and the choice of ultra-modifier, and can be found with a little trial and error.

In examples 21-24 Geon 103 EP-F76 PVC homopolymer is master-batched with lubricant and stabilizer in a manner analogous to that described in the previous examples. The concentration of comodifier is varied in a range up to about 15% and the concentration of rubber maintained at about 7 phr based on total resin. All batches include 3 g of 2301×36, 2 g of T-31 and 0.5 g of Hywax 125. The test samples are annealed in a vacuum oven at 70° C. for 7 days to ensure essentially complete loss of excess free volume present in the original, quenched state of the sample, as described by Foltz, C.R. and McKinney, P.V., J. Appl. Polymer Sci. 13, 2235 (1969). Each Izod impact strength tabulated in Table IV hereinbelow is the average of six samples.

In the examples herein, it will be noted that linear and radial teleblock ultra-modifiers may be mixed, as may be diblock and polyblock ultra-modifiers. In particular, it is generally economically beneficial to mix linear diblocks (SB) and radial teleblocks (SBS) of styrene-butadiene block copolymers, such as for example those commercially available under the Solprene trademarks. Similarly it may be economical to mix linear diblocks and linear polyblocks, or, radial teleblocks of different structure, or ultra-modifiers having the same structure but differing in molecular weight.

TABLE IV

| Ex. No. | Matrix GEON 103EP-F76 g | Co-modifier Blendex 301 g | Ultra-modifier KRO3 g | % rubber from KRO3 | Izod impact at 0° C. (ft-lb/in) clean | hinged | std. dev. (±S) |
|---|---|---|---|---|---|---|---|
| 21 | 90.7 | 16.3 | 0 | 0 | 1.87 | — | 0.35 |
| 22 | 89.3 | 14.7 | 3.0 | 10 | 2.9 | 6.8 | 1.3* |
| 23 | 87.9 | 13.0 | 6.1 | 20 | 4.4 | 10.3 | 1.3* |
| 24 | 86.5 | 11.4 | 9.1 | 30 | 3.2 | — | 0.28 |

*for hinged breaks

The results set forth in Table IV are evidence that the synergistic improvement obtained with the ultra-modifier is not transient, and can be expected to persist during use of articles molded from the ultra-modifier resin.

In the examples 25–32 Geon 103 EP-F76 PVC homopolymer is master-batched with lubricant and stabilizer as described hereinbefore. The concentration of co-modifier is varied so that each batch includes 5phr rubber based on total resin, and when KRO3 ultra-modifier is added, its contribution of rubber replaces 20% of the rubber from the co-modifier. All batches include 3 g of K120N, 2 g of T-31 and 0.5 g of Hywax 125. Those skilled in the art will appreciate that the choice of lubricants and stabilizers for the examples herein is predicated on the processing conditions of the composition. Other processing conditions might dictate the use of mixed internal and external lubricants such as butyl stearate and polyethylene respecitvely, and one or more stabilizers, in greater or lesser concentrations. Those skilled in the art will appreciate that the choice of lubricants and stabilizers for the processing conditions of the composition. Other processing conditions might dictate the use of mixed internal and external lubricants such as butyl stearate and polyethylene respectively, and one or more stabilizers, in greater or lesser concentrations.

TABLE V

| Ex. No. | Matrix GEON 103EP-F76 g | Co-modifier PMMA/PBA g | Ultra-modifier KRO3 g | Particle size, ultra-modifier (range), Å | Wt. avg. part. sz co-modifier Å | Izod impact (ft-lb/in) clean | hinged |
|---|---|---|---|---|---|---|---|
| 25 | 98.3 | 6.7 | — | 400–1000 | 750 | 1.99 | — |
| 26 | 95.3 | 5.4 | 4.4 | 200–4000 | 750 | — | 22.3 |
| 27 | 97.4 | 7.6 | — | 900–2600 | 2,000 | 1.77 | — |
| 28 | 94.6 | 6.1 | 4.4 | 200–4000 | 2,000 | 3.16 | 23.0 |
| 29 | 98.9 | 6.1 | — | 700–5500 | 4,300 | 1.12 | — |
| 30 | 95.8 | 4.9 | 4.4 | 200–6000 | 4,300 | 2.8 | — |
| 31 | 98.1 | 6.9 | — | 12000–21000 | 17,500 | 1.73 | — |
| 32 | 95.1 | 5.5 | 4.4 | 200–21000 | 17,500 | 3.02 | — |

From the foregoing data it is evident that substituting a portion of the co-modifier with ultra-modifier produces an unexpected increase in impact strength. This increase is observed with co-modifier particle sizes in the range from about 750 Å to about 17,500 Å, and with ultra-modifier particle sizes in the range from about 200 Å to about 21,000 Å. Though hinged breaks are not always obtained with ultra-modifier added, it is apparent that the clean breaks occur at substantially higher impact values.

In examples 33–36 hereinbelow, Geon 103EPF76 PVC homopolymer is blended with PMMA/PBA (Rohm & Haas KM323B) co-modifier, and in examples 37–39, a Geon 202 vinyl chloride/vinylidene chloride copolymer is blended with the same amounts of KM323B co-modifier. Two radial block copolymer SBS K-resins, namely KRO-1 and KRO-3, are used. All batches are compounded to contain 5 phr rubber, based on total resin, and milled at 170° C. for 2 min before being compression-molded at about 177° C. As usual calcium stearate (0.5 g) and T-31 stabilizer (2 g) are added to each batch. Each Izod impact strength is the average of six test samples.

TABLE VI

| Ex. No. | Matrix GEON g | Co-modifier PMMA/PBA g | Ultra-modifier g | Izod impact (ft-lb/in) | std. dev. (±S) |
|---|---|---|---|---|---|
| | GEON 103EP-F76 | | | | |
| 33 | 100 | — | — | 0.20 | 0 |
| 34 | 97.4 | 7.6 | — | 1.1 | 0.33 |
| 35 | 94.6 | 6.1 | 4.4(KRO3) | 1.86 | 0.16 |
| 36 | 94.6 | 6.1 | 4.4(KRO1) | 1.43 | 0.17 |
| | GEON 202 | | | | |
| 37 | 100 | — | — | 0.30 | 0.16 |
| 38 | 97.4 | 7.6 | — | 0.66 | 0. |
| 39 | 94.6 | 6.1 | 4.4(KRO3) | 1.71 | 0.48 |

From the foregoing data it is evident that the combination of co-modifier and ultra-modifier produces an article of higher impact strength than co-modifier alone, having an equivalent amount of rubber.

The 103EP-F76 Geon brand PVC resin used in the foregoing tests is a commercial grade having an inherent viscosity of about 0.92 as determined by a test currently designated ASTM D-1243-66. The Geon 202 brand resin is also a commercial grade and has an inherent viscosity of about 0.85. The Geon 110×233 brand resin used in previous examples is also a commercial grade having an inherent viscosity of about 0.68. Commercially available resins, comodifiers, ultra-modifiers, stabilizers and the like are used in the examples and are identified by their brand names for the purpose of specificity. Comparable results are obtained with comparable materials irrespective of brand name.

In each of the examples 40–47 hereinbelow, Geon 103EP-F76PVC homopolymer is blended with 3.0 phr K-120N processing aid available from Rohm & Haas Co., 0.5 phr Hywax 125 hydrogenated sperm oil lubricant 2.0 phr T-831 Thermolite stabilizer, and the amounts of different co-modifiers and Solprene 406 radial teleblock copolymer are varied, so that the impact-modified PVC contains about 6 phr rubber based on total resin. The components are melt-blended by milling at 175° C. for 2 mins. to yield a uniform melt which is compression molded at 175° C. Izod impact values are the average of six samples.

TABLE VII

| Ex. No. | Matrix GEON 103 EP-F 76 g | Co-Modifier (g) Blendex 301 | Ultra-Modifier Solprene 406 g | Total Rubber g | Rubber from SBS % | Izod impact ft-lb/in | Std. dev. ±S |
|---|---|---|---|---|---|---|---|
| 40 | 100 | 0 | 0 | 0 | 0 | 0.65 | .005 |
| 41 | 100 | 10 | 0 | 4.3 | 0 | 16.9 | 1.7 |
| 42 | 100.9 | 7 BTAIIIS | 2.1 | 4.3 | 29 | 19.1 | 1.3 |
| 43 | 100 | 6.5 | 0 | 5 | 0 | 3.08 | 0.12 |
| 44 | 99.9 | 4.55 KM323B | 2.5 | 5 | 30 | 20.0 | 0.9 |
| 45 | 100. | 7.6 | 0 | 5 | 0 | 2.18 | 0.04 |
| 46 | 99.8 | 5.3 | 2.5 | 5 | 30 | 3.0 | 0.05 |
| 47 | 100 | 0 | 8.35 | 5 | 100 | 1.7 | 0.34 |

It is seen from the foregoing data that by replacing about 30 percent of the rubber in the graft copolymers with block copolymer ultra-modifier and maintaining the total rubber content of the compositions, the impact strength is unexpectedly increased. Where no co-modifier is present and all the rubber is contributed by the ultra-modifier, impact strength is worse than if all the rubber is contributed by co-modifier.

In each of the examples 48-52 hereinbelow, Geon 100×334 PVC homopolymer is blended as in the preceding examples set forth in Table VII above, with 3.0 phr K-120 N processing aid, 0.5 phr Hywax and 2.0 phr T-831 thermolite stabilizer, while varying the amounts of graft copolymer and ultra-modifier. A SB diblock copolymer available as Solprene 1205 in crumb form, and a SBS radial block copolymer available as Solprene 422 are used herebelow. The components are melt-blended by milling at 170° C. for 2 mins and compression molded at 175° C. As before Izod impact values are the average of six samples.

TABLE VIII

| Ex No. | Matrix Geon 110 × 334 g | Co-Modifier (BTA III N) g | Ultra-Modifier g | Total Rubber SBR + B g | % rubber from Ultra-Modifier | Izod Impact ft-lb/in | Std dev. ±S |
|---|---|---|---|---|---|---|---|
| 48 | 100 | 9.0 | 0 Solprene 1205 | 6.9 | 0 | 1.54 | 0.16 |
| 49 | 100 | 6.0 | 3.0 | 6.9 | 33 | 1.54 9.1* | 0.23 0.20* |
| 50 | 100 | 0 | 9.0 Solprene 422 | 6.8 | 100 | 1.2 | 0.21 |
| 51 | 100 | 6.0 | 3.0 | 7.0 | 34 | 2.16 12.8* | 0.45 0.9* |
| 52 | 100 | 0 | 9.0 | 7.2 | 100 | 1.53 | 0.36 |

*hinged break

From the foregoing data it is evident that both the diblock copolymer and the radial block copolymer each produce a synergistic improvement in impact strength as long as co-modifier is also present in an amount sufficient to provide at least a 20% improvement in impact over that when there is no impact modifier present, whether it is a co-modifier or ultra-modifier. Typically the un-modified impact strength of 110×334 Geon homopolymer is less than 1 ft-lb/in.

In the following examples 53-57 hereinbelow, the synergistic improvement in impact strength of the composition of this invention due to a crumb SB diblock Solprene 1205 copolymer is demonstrated. As in the examples of Table VIII hereinabove, each composition is compounded with Geon 110×334 PVC homopolymer, 3.0 phr K120N processing aid, 0.5 phr Hywax and 2.0 phr T-831 stabilizer, and the amounts of an MBS type co-modifier (BTA III N) and ultra-modifier are varied maintaining a constant 10 phr of combined co-modifier and ultra-modifier. All compositions are melt-blended by milling at 170° C. for 2 mins to produce a uniform melt, and compression molded at 175° C. Solprene 1205 diblock contains about 75% butadiene and 25% styrene; BTA III N contains about 77% SBR (rubber).

TABLE IX

| Ex. No. | Matrix Geon 110 × 334 g | Co-Modifier BTA III N g | Ultra-Modifier Solprene 1205 g | Izod impact (ft-lb/in) clean | Izod impact (ft-lb/in) hinged | Std. Dev. ±S clean | Std. Dev. ±S hinged |
|---|---|---|---|---|---|---|---|
| 53 | 100 | 10 | 0 | 2.6 | 10.8 | 1.4 | 2.5 |
| 54 | 100 | 8 | 2 | — | 13.6 | — | 1.1 |
| 55 | 100 | 7 | 3 | — | 13.3 | — | 1.8 |
| 56 | 100 | 5 | 5 | — | 12.1 | — | 1.2 |
| 57 | 100 | 0 | 10 | 1.07 | — | 0.34 | — |

In any of the foregoing examples, SB diblock and SBS polyblock ultra-modifiers, whether linear or radial, may be used in mixed form, and the ratio of diblock to SBS polyblock may be varied in the mixture to produce a resin of desirable optical properties with an impact strength tailored for a particular purpose. Similarly, more than one co-modifier may be used, or a single co-modifier may be used with varying particle sizes and molecular weights, allowing an additional degree of latitude in tailoring a resin for further desirable physical characteristics and desired impact performance.

In the following examples 58-65 the synergistic improvement in impact strength of the composition of this invention which includes a chlorinated polyethylene (CPE) impact modifier and a Solprene 406 SBS radial block copolymer, is demonstrated. Each composition is compounded with Geon 103EPF76 PVC homopolymer, 3phr 2301×36 styrene-acrylonitrile processing aid which by itself exhibits no impact improvement, 2 phr T-31 stabilizer and 1 phr calcium stearate. The components are milled at 188° C. and melt-blended the Izod impact strengths set forth is the average of six samples.

TABLE X

| Ex. No. | Matrix GEON 103EP-F76 g | Co-modifier CPE g | Ultra-modifier Solprene g | Total rubber g | Rubber from SBS % | Izod impact ft-lb/in | Std. Dev. (±S) |
|---|---|---|---|---|---|---|---|
| 58 | 100 | 7.5 | — | 7.5 | 0 | 0.76 | 0.22 |

TABLE X—Continued

| Ex. No. | Matrix GEON 103EP-F76 g | Co-modifier CPE g | Ultra-modifier Solprene g | Total rubber g | Rubber from SBS % | Izod impact ft-lb/in | Std. Dev. (±S) |
|---|---|---|---|---|---|---|---|
| 59 | 100 | 9.0 | — | 9.0 | 0 | 1.11 | 0.24 |
| 60 | 98.3 | 5.0 | 4.2 | 7.5 | 33 | 16.4* | 1.7 |
| 61 | 98. | 6.0 | 5.0 | 9.0 | 33 | 15.9* | 0.7 |
| 62 | 100 | — | 6.0 | 3.6 | 100 | 1.34 | 0.03 |
| 63 | 100 | — | 9.0 | 5.4 | 100 | 1.49 | 0.04 |
| 64 | 100 | — | 12.5 | 7.5 | 100 | 0.97 | 0.38 |
| 65 | 100 | — | 15. | 9.0 | 100 | 1.02 | 0.31 |

*hinged break

It is evident from the foregoing data that the ultra-modifier is effective only in combination with the CPE impact modifier. It is especially noteworthy that a halogenated polyolefin impact modifier with ultra-modifier permits quick melt-blending at relatively high temperatures, yet provides unexpectedly enhanced impact strength.

In an analogous manner other conventional impact modifiers, which are not hard shell type graft copolymers may be used, optionally in combination with a SB diblock or SBS polyblock copolymer.

I claim:

1. A normally rigid thermoplastic composition comprising (a) a matrix comprising a vinyl chloride resin, (b) an impact modifier or co-modifier in said matrix for reducing the brittle temperature of said vinyl chloride resin, said impact modifier being present in an amount in the range from about 3 percent to about 25 percent by weight based on total resinous components, so as to produce at least a 20 percent improvement in Izod impact strength of non-impact-modified vinyl chloride resin, and (c) a block copolymer ultra-modifier consisting essentially of a block copolymer of a vinyl aromatic compound (S) and a conjugated diene (D), wherein said vinyl aromatic compound (S) is selected from the group consisting of styrene, α-methyl styrene, vinyl toluene, vinyl xylene, and vinyl naphthalene, said conjugated diene (D) is selected from the group consisting of butadiene, isoprene, 1,3-pentadiene, and 2,3-dimethyl-butadiene, wherein said ultra-modifier is present in an amount in the range from about 1 percent to about 15 percent by weight, based on the total resinous components of said composition, and said co-modifier and said ultra-modifier are each present as distinguishable impact modifier particles dispersed in said vinyl chloride resin.

2. The composition of claim 1 wherein said vinyl chloride resin is selected from the group consisting of copolymers of vinyl chloride and a homopolymer of vinyl chloride.

3. The composition of claim 2 wherein said copolymers of vinyl chloride consist essentially of copolymers of vinyl chloride and a monomer copolymerizable therewith selected from the group consisting of vinyl esters, α-olefins, alkyl acrylates, and alkyl methacrylates having up to about 18 carbon atoms in the alkyl moiety.

4. The composition of claim 3 wherein said copolymer is selected from the group consisting of vinyl chloride/vinyl acetate, vinyl chloride/vinyl propionate and vinyl chloride/vinyl ethylene.

5. The composition of claim 1 wherein said co-modifier is present in an amount in the range from about 5 percent to about 10 percent by weight of the total resinous components of said composition.

6. The composition of claim 2 wherein, in said co-modifier there are present primary resin particles in the size range from about 500 Å (Angstrom) to about 7000 Å, provided that less than 20 percent by weight are greater than about 5000 Å.

7. The composition of claim 2 wherein said co-modifier is a grafted interpolymerization product of a hard resin and rubbery polymer, wherein said hard resin is derived from a monounsaturated vinyl monomer.

8. The composition of claim 2 wherein said co-modifier is selected from the group consisting of chlorinated polyethylene, nitrile rubber, styrene-butadiene rubber, stearic acid coated calcium carbonate, ethylene-vinyl acetate copolymers and acrylate-methacrylate copolymers.

9. The composition of claim 2 wherein said block copolymer ultra-modifier has a structure selected from a polyblock structure including a linear diblock, linear triblock, and a radial teleblock structure.

10. The composition of claim 6 wherein said vinyl chloride polymer has primary resin particles in the size range from about 2500 Å to about 2μ (micron), and said block copolymer ultra-modifier has primary particles in the size range from about 200 Å to about 1μ.

11. The composition of claim 9 wherein said ultra-modifier includes vinyl aromatic compound units which comprise from about 20 to about 80 percent by weight, and diene units which comprise from about 80 to about 20 percent by weight of said block copolymer ultra-modifier.

12. The composition of claim 10 wherein said block copolymer ultra-modifier is present in an amount in the range from about 2 to about 6 percent by weight, based on the total resinous components of the composition.

13. The composition of claim 12 wherein said ultra-modifier is a rubbery block copolymer.

14. A reinforced composition as defined in claim 1 including a reinforcing amount of fibrous glass.

15. A method for preparing a normally rigid thermoplastic article comprising melt-blending (a) a vinyl chloride resin, (b) an impact modifier or co-modifier in said matrix for reducing the brittle temperature of said vinyl chloride resin, said impact modifier being present in an amount in the range from about 3 percent to about 25 percent by weight based on total resinous components, so as to produce at least a 20 percent improvement in Izod impact strength of non-impact-modified vinyl chloride resin, and (c) a block copolymer ultra-modifier consisting essentially of a block copolymer of a vinyl aromatic compound (S) and a conjugated diene (D), wherein said vinyl aromatic compound (S) is selected from the group consisting of styrene, α-methyl styrene, vinyl toluene, vinyl xylene, and vinyl naphthalene, said conjugated diene (D) is selected from the group consisting of butadiene, isoprene, 1,3-pentadiene, and 2,3-dimethyl-butadiene, wherein said block copolymer ultra-modifier is present in an an amount in the range from about 1 percent to about 15 percent by weight, based on the total resinous components of said composition, to obtain a uniform melt, said co-modifier and said ultra-modifier being each present as distinguishable impact modifier particles dispersed in said vinyl chloride resin; and, shaping said melt to form said article.

* * * * *